Patented Aug. 4, 1936

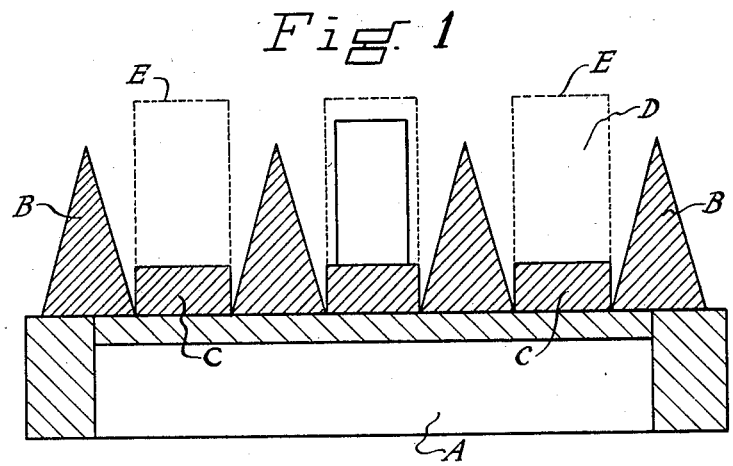
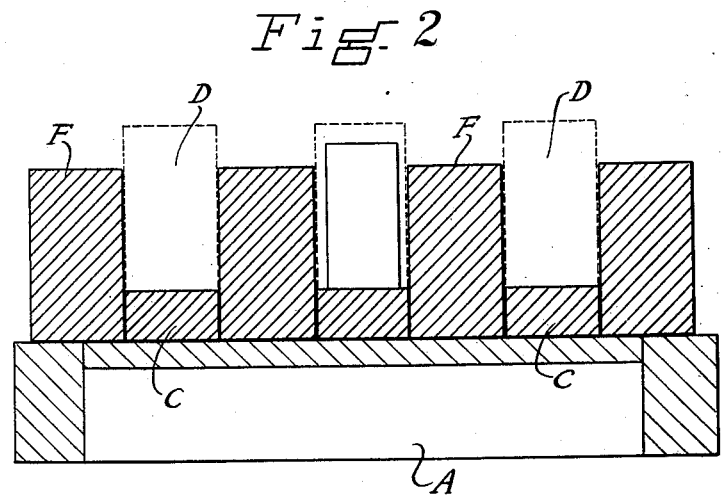
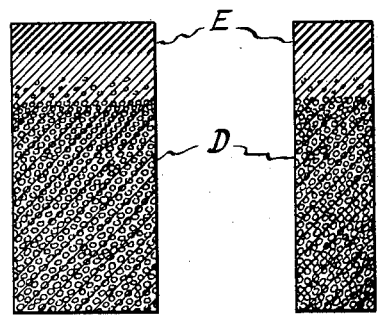

2,050,225

UNITED STATES PATENT OFFICE 2,050,225

METHOD OF MAKING COMPOSITE BRICK

Anthony M. Kohler, New York, N. Y., assignor to The Babcock & Wilcox Company, Bayonne, N. J., a corporation of New Jersey Application May 21, 1932, Serial No. 612,711
Renewed June 21, 1934

7 Claims. (Cl. 25—156)

This invention has reference to a composite brick or building unit for furnaces and the like, and which serves the purpose of a super-refractory and an insulator with but a single unit where formerly separate units bonded together were required, and with consequent loss in efficiency through thermal conductivity.

It has generally been the practice in the past to form furnace walls with fire brick of suitable thickness backed up by insulating materials of various descriptions, but the use of different kinds of materials with their different physical characteristics produces trouble by reason of inability to satisfactorily bond the same together, with the result that a wall of relatively short life is produced in an expensive manner by reason of the number of joints required, and which has a large heat loss, as above mentioned, through thermal conductivity.

The present invention provides a single building unit incorporating low thermal conductivity with general ability of the unit as a whole to withstand high furnace temperatures and provided with an integral portion which is super-refractory in its character.

A further feature of the invention is a unit of the above described character which is uniformly porous, with the exception of the super-refractory portion, and with a minimum of shrinkage, and the super-refractory face of which presents a dense, substantially non-porous, vitrified, glazed surface, highly resistant to spalling and abrasion.

The particular invention herein involved is the article and the method of producing the same.

With the above and other features in mind there will now be described one specific embodiment of the invention and manner of producing the same as illustrated in the accompanying drawing, wherein—

Fig. 1 is a diagrammatic view showing one type of set-up in the kiln for firing the building units of the present invention;

Fig. 2 is a modified form of set-up;

Fig. 3 is a longitudinal section of a brick or building unit manufactured in accordance with the present invention;

Fig. 4 is a horizontal section through the brick shown in Fig. 3.

One manner in which the brick or unit may be formed is, for instance, by preparing the brick, shapes or units for firing by forming a mixture of materials in which there is 40% kaolin, 20% grog made from burned cellular and porous units and 40% wood flour, these percentages being by weight. The kaolin and grog are then ground and mixed with water to pass through a 38 mesh screen; these pulverized earthy materials are then mixed with wood flour, all of which should be fine enough to pass a 35 mesh screen, and most of it to pass a 48 mesh screen. About 200 pounds of water to 100 pounds of dry mix will be found suitable to make a slip of the right consistency to pour into brick molds. This water slip is frothed by beating and stirring vigorously, or by blowing air through the vessel containing it, or by both blowing and beating simultaneously until the whole is filled and distended with air bubbles. Air, of course, is representative of any gas which may be employed, and is the obviously economical gas to use.

The wood flour in this mix forms nuclei with which the air bubbles are associated. Up to a roughly determinable point, the finer the organic, bubble-nucleating material, the smaller will be the bubbles in the froth; after this, further comminution of the nucleus particles does not appear to have any effect. The use of organic material here, as in earlier cellular brick making, implies the ultimate combustion of such material during the process of burning the brick, but in this present process it has functional significance also in the nucleation and preliminary retention of froth bubbles. For this reason, organic material which is absorbent of water, and swells in water, as for instance starch or wheat flour, is to be avoided, and water-insoluble, finely divided organic material, such as wood flour, is to be employed.

When the slip is thoroughly frothed, it should be poured immediately into filter molds, so that removal of excess water from the mud surrounding the bubbles, and consequent thickening of the slip material constituting the walls or partitions between bubbles shall proceed before the froth-bubbles have time to collapse, and their air to escape, to any serious or material extent. The wood flour particles at the initial stage function to retard bubble-bursting and general subsidence of the froth from that cause, but are effective only to retard it. Removal of excess water by filtration, (which should be accelerated by pressure differential, preferably by a combination of partial vacuum on the filter bed side and mold-head pressure on the top, or by centrifugal action) quickly causes the slip mixture or mud to thicken to such consistence that the imprisonment of the froth-bubbles is made permanent, the whole brick shape being then a set froth, containing a very high volumetric percentage of froth voids, of very small magnitude, fairly uniform in size, and uniformly distributed.

Filtration soon makes the brick shapes stiff enough to handle, and these are set in a shod or drying rack and dried at about 200° F. for from 12 to 18 hours. The shods should be oiled to prevent the shapes from sticking. The shapes are then ready for firing according to the following method:

A represents a support which is to be placed in the kiln, and on this are assembled triangular shaped refractory members B between which are supports C which receive the brick shapes D on end, a brick shape D being placed between two triangular members and having its upper end E extending thereabove. The brick shapes are placed on end so as to minimize the dragging effect on the supporting surface during shrinkage which is inevitable, and also so as to produce the desired super-refractory effect upon one end of the brick, as will be hereafter described. At or before the application of temperature at which, in the presence of oxygen, combustion of the organic inclusion of wood flour would begin, a reducing atmosphere is produced in the kiln, and maintained until the kaolin has ceased to shrink, the shrinkage being due to loss of water of combination, which begins at or about 1100° F. As it is imperative to control the rate of temperature rise and therefore the rate of shrinkage, combustion of the organic inclusion, which would raise the temperature rapidly, and take its rate out of control, is to be avoided until the shrinkage ceases.

As no appreciable shrinkage sets in below about 1100° F. the kiln temperature may be raised at a fairly rapid rate up to this point, provided a reducing atmosphere is maintained; say an hour or slightly less. Thereafter, and until a temperature of about 1700° is reached, the rate of temperature rise is retarded, being held at about 100° F. increase per hour. At, or about, 2100° F., reducing atmosphere is replaced by an oxidizing atmosphere, and the carbonized particles of organic inclusion eliminated by combustion. By this time the brick shapes will have shrunk to their limit, and the acceleration of temperature rise by burning of the carbon will have no detrimental effect. The final temperature of burning of the brick shapes will be in the neighborhood of 3000° to 3100° F., but by reason of the shielding afforded by the elements B the only portion of the brick shapes reaching such temperatures will be the upper end portion E, the balance of the brick shapes being shielded so that their lower portion may never attain a temperature sufficient to cause vitrification or fusion. The result is that the upper end portion E of the brick is fused and vitrified to provide a super-refractory, smooth, glazed surface, while the lower portion of the brick has uniform porosity affording low thermal conductivity.

As an alternative to the triangular shaped pieces B the same set-up may be used with bricks F between adjacent raw shapes D with the result that the protection afforded will be much the same as with the triangular shapes, and the bricks produced will be of a character having the super-refractory end and the remainder of the body uniformly porous.

While, in the foregoing, I have described a specific embodiment of the invention for the purpose of making such disclosure as is required by statute, it is nevertheless to be understood that in practicing the invention I may resort to any and all modifications falling within the scope of the appended claims.

I claim:

1. The method of manufacturing a refractory insulating brick, which includes the steps of mixing powdered refractory and organic particles with a liquid, aerating the mixture to provide minute voids in the finished brick, then molding and deliquidizing the mixture, and finally burning at a temperature imparting the requisite refractory degree and which also eliminates the organic particles, leaving minute voids in addition to those created by aeration, while protecting the major portion of the brick from heat intense enough to impart super-refractory qualities to the unprotected portion of the brick.

2. The method of manufacturing a refractory insulating brick, which includes the steps of mixing powdered refractory and fibrous organic particles with a liquid, aerating the mixture to provide minute voids in the finished brick, then molding and deliquidizing the mixture, and finally burning at a temperature imparting the requisite refractory degree and which also eliminates the fibrous organic particles, leaving minute voids in addition to those created by aeration, while protecting the major portion of the brick from heat intense enough to impart super-refractory qualities to the unprotected portion of the brick.

3. In the manufacture of an insulating firebrick having a furnace face portion of higher density and higher heat resistance than the remainder which has greater thermal insulating capacity, mixing powdered refractory and fibrous combustible organic particles with liquefying materials to thereby produce a mass of uniform composition and consistency aerating the mixture to provide minute voids in the finished brick, then molding and deliquidizing the molded shape, eliminating the fibrous organic particles by burning, and controlling the burning by concentrating the imparted heat on the furnace face portion so that one burning operation imparts to the burned brick different thermal characteristics of the types mentioned above.

4. In the manufacture of an insulating firebrick having a dense furnace face portion of high heat resistance and the remainder of its body of greater heat insulating properties, molding a mass of uniformly mixed refractory and fibrous combustible organic material to produce a homogenous ceramic shape, burning the molded ceramic shape while controlling the burning by thermally shielding the major portion of its body and simultaneously concentrating the imparted heat on the furnace face portion of the shape so that one burning operation creates a unitary refractory having multiple thermal characteristics of the types mentioned above.

5. In the manufacture of an insulating firebrick having a dense furnace face portion of high heat resistance and the remainder of its body of greater heat insulating properties, subjecting a molded ceramic shape to a burning while thermally shielding its main portion so that one burning imparts multiple thermal characteristics of the above indicated types.

6. In the manufacture of an insulating firebrick having a dense furnace face portion of high heat resistance and the remainder of its body of greater heat insulating properties, subjecting a molded ceramic shape to a burning operation while concentrating the imparted heat on the furnace face portion of the shape so that a refractory body is formed having multiple thermal characteristics of the above indicated types.

7. In the manufacture of an insulating firebrick having a furnace face portion of higher density and of higher heat resistance than the remainder of its body which is of greater heat insulating properties, molding a plastic mass of uniform composition and consistency to produce a ceramic shape, burning the molded ceramic shape while controlling the burning so that the furnace face portion of the shape is subjected to greater heat as to temperature and time than the remainder of the shape whereby one burning operation creates a unitary refractory having multiple thermal characteristics of the types mentioned above.

ANTHONY M. KOHLER.